US009619286B1

(12) United States Patent
Wagner et al.

(10) Patent No.: US 9,619,286 B1
(45) Date of Patent: Apr. 11, 2017

(54) USING REQUEST SERVICE TIME AS FAIRNESS HEURISTIC IN LOCKING TECHNIQUES

(71) Applicant: EMC Corporation, Hopkinton, MA (US)

(72) Inventors: Michael P. Wagner, Raleigh, NC (US); David Haase, Varina, NC (US); Charles C. Bailey, Cary, NC (US); Michael C. Brundage, Cary, NC (US); Alan L. Taylor, Cary, NC (US); Chung-Huy Chen, Cary, NC (US); Dennis T. Duprey, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 272 days.

(21) Appl. No.: 14/220,391

(22) Filed: Mar. 20, 2014

(51) Int. Cl.
*G06F 9/50* (2006.01)
(52) U.S. Cl.
CPC .................. *G06F 9/5011* (2013.01)
(58) Field of Classification Search
None
See application file for complete search history.

(56) References Cited

U.S. PATENT DOCUMENTS

| | | | |
|---|---|---|---|
| 2006/0206758 A1* | 9/2006 | Butterworth | G06F 9/46 714/11 |
| 2013/0227583 A1* | 8/2013 | Gargash | G06F 1/329 718/104 |
| 2013/0263209 A1* | 10/2013 | Panuganty | H04L 43/04 726/1 |
| 2014/0245309 A1* | 8/2014 | Otenko | G06F 9/546 718/102 |

* cited by examiner

*Primary Examiner* — Kenneth Tang
(74) *Attorney, Agent, or Firm* — Muirhead and Saturnell, LLC

(57) ABSTRACT

Techniques for processing requests are described. A first thread is selected for execution. Only a single thread is allowed to execute at a time. Each thread is associated with a queue of requests to be processed by the thread. A first request is selected from the queue of first thread that performs first processing to service the first request. A service time classification for the first request is determined in accordance with criteria that includes a runtime determination of what resource(s) are used in servicing the first request. It is determined, in accordance with the service time classification, whether to allow the first thread to continue execution and process a second request from the queue of the first thread. If the first thread is allowed to continue execution, second processing is performed by the first thread to service the second request. Otherwise, a second thread is selected for execution.

19 Claims, 7 Drawing Sheets

S1: Thread A acquires Lock
S2: Thread A services Request A:1
S3: Thread A released Lock
S4: Thread B acquires Lock
S5: Thread B services Request B:1
S6: Thread B releases Lock
S7: Thread A acquires Lock
S8: Thread A services Request A:2
S9: Thread A releases Lock
S10: Thread B acquires Lock
S11: Thread B services Request B:2
S12: Thread B released Lock
S13: Thread A acquires Lock
S14: Thread A services Request A:3
S15: Thread A releases Lock
S16: Thread B acquires Lock
S17: Thread B services Request B:3
S18: Thread B releases Lock
S19: Thread A acquires Lock
S20: Thread A services Request A:4
S21: Thread A releases Lock
S22: Thread B acquires Lock
S23: Thread B services Request B:4
S24: Thread B releases Lock
S25: Thread A acquires Lock
S26: Thread A services Request A:5
S27: Thread A releases Lock
S28: Thread B acquires Lock
S29: Thread B service Request B:5
S30: Thread B releases Lock

FIG. 4

USING REQUEST SERVICE TIME AS FAIRNESS HEURISTIC IN LOCKING TECHNIQUES

BACKGROUND

Technical Field

This application generally relates to servicing requests, and more particularly to locking techniques used in connection with servicing requests.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage system containing a plurality of host interface units, disk drives, and disk interface units. Such storage systems are provided, for example, by EMC Corporation of Hopkinton, Mass. The host systems access the storage system through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units, logical devices, or logical volumes (LVs). The logical disk units may or may not correspond to the actual disk drives. Allowing multiple host systems to access the storage system allows the host systems to share data stored therein.

SUMMARY OF THE INVENTION

In accordance with one aspect of the invention is a method of processing requests comprising: selecting a first thread of a plurality of threads for execution at a first point in time, wherein only a single one of the plurality of threads is allowed to execute at a time and wherein each of the plurality of threads is associated with one of a plurality of queues of requests to be processed by the each thread; selecting a first request from the one queue of requests associated with the first thread; performing first processing by the first thread to service the first request; determining, in accordance with one or more criteria, a service time classification for servicing the first request, wherein the one or more criteria include a runtime determination of what one or more resources are used by the first processing in servicing the first request; determining, in accordance with the service time classification, whether to allow the first thread to continue execution and process a second request from the one queue of requests associated with the first thread; and if it is determined in accordance with the service time classification to allow the first thread to continue execution, performing second processing by the first thread to service the second request, and otherwise, selecting a second of the plurality of threads for execution. The service time classification may be determined without measuring an actual amount of time that has elapsed since the first thread commenced execution at the first point in time. The one or more criteria may include a runtime determination as to whether the first processing issued an I/O request to a storage device in connection with servicing the first request. If the first processing issued an I/O request to a storage device in connection with servicing the first request, the service time classification may be a first value denoting a first estimated service time for servicing the first request whereby the first estimated service time is greater than or equal to a first amount of time. The one or more criteria may include a runtime determination as to whether the first processing only used a memory resource in connection with servicing the first request. If the first processing only uses a memory resource in connection with servicing the first request, the service time classification may be a second value denoting a second estimated service time for servicing the first request whereby the second estimated service time is less than a first amount of time. If the service time classification is the second value, the first thread may be allowed to continue execution. If the service time classification is the first value, the first thread may not be allowed to continue execution and may enter a waiting state, and the second thread may be selected for execution. The method may also include determining a number of requests the first thread has processed since commencing execution at the first point in time; determining whether the number of requests exceeds a maximum number of requests; and if it is determined that the number of requests exceeds the maximum number of requests, selecting another one of the plurality of threads for execution rather than the first thread, and otherwise allowing the first thread to continue execution processing another request from the one queue of requests associated with the first thread. A lock may be used to enforce a processing requirement that only a single one of the plurality of threads is allowed to execute at a time whereby, prior to the single one of the plurality of threads servicing any request, the single one of the plurality of threads acquires the lock. Prior to the first thread servicing any request after commencing execution at the first point in time, the first thread may acquire the lock. If it is determined in accordance with the service time classification not to allow the first thread to continue execution, the method may further include releasing the lock by the first thread, wherein after the releasing, the first thread waits to reacquire the lock and to be scheduled again for execution; and responsive to the releasing, acquiring the lock by the second thread and commencing execution of the second thread, wherein the second thread acquires the lock prior to the second thread servicing any request. The plurality of threads may process requests in a data storage system. Requests in each of the plurality of queues of requests may be processed on a first-in-first-out basis by a corresponding one of the plurality of threads associated with each queue.

In accordance with another aspect of the invention is a computer readable medium comprising code stored thereon that processes requests, wherein the computer readable medium comprises code, that when executed by a processor, performs a method comprising: selecting a first thread of a plurality of threads for execution at a first point in time, wherein only a single one of the plurality of threads is allowed to execute at a time and wherein each of the plurality of threads is associated with one of a plurality of queues of requests to be processed by each thread; selecting a first request from the one queue of requests associated with the first thread; performing first processing by the first thread to service the first request; determining, in accordance with one or more criteria, a service time classification for servicing the first request, wherein the one or more criteria include a runtime determination of what one or more resources are used by the first processing in servicing the first request; determining, in accordance with the service time classification, whether to allow the first thread to continue execution and process a second request from the one queue of requests associated with the first thread; and if it is determined in accordance with the service time classification to allow the first thread to continue execution, performing second processing by the first thread to service the second request, and otherwise, selecting a second of the plurality of threads for execution. The service time classification may be determined without measuring an actual amount of time that has elapsed since the first thread commenced execution at the first point in time. The one or more criteria may include a runtime determination as to whether the first processing issued an I/O request to a storage device in connection with servicing the first request. If the first processing issued an I/O request to a storage device in connection with servicing the first request, the service time classification may be a first value denoting a first estimated service time for servicing the first request whereby the first estimated service time is greater than or equal to a first amount of time. If the service time classification is the first value, the first thread may not be allowed to continue execution.

In accordance with another aspect of the invention is a system comprising: a plurality of storage devices; at least one processor that executes machine readable instructions; a memory comprising code stored that, when executed, performs a method comprising: selecting a first thread of a plurality of threads for execution at a first point in time, wherein only a single one of the plurality of threads is allowed to execute at a time and wherein each of the plurality of threads is associated with one of a plurality of queues of requests to be processed by each thread; selecting a first request from the one queue of requests associated with the first thread; performing first processing by the first thread to service the first request; determining, in accordance with one or more criteria, a service time classification for servicing the first request, wherein the one or more criteria include a runtime determination of what one or more resources are used by the first processing in servicing the first request; determining, in accordance with the service time classification, whether to allow the first thread to continue execution and process a second request from the one queue of requests associated with the first thread; and if it is determined in accordance with the service time classification to allow the first thread to continue execution, performing second processing by the first thread to service the second request, and otherwise, selecting a second of the plurality of threads for execution.

BRIEF DESCRIPTION OF THE DRAWINGS

Features and advantages of the present invention will become more apparent from the following detailed description of exemplary embodiments thereof taken in conjunction with the accompanying drawings in which:

FIG. 4 is an example illustrating steps performed by two threads using FIG. 3 processing;

DETAILED DESCRIPTION OF
EMBODIMENT(S)

Figure 1:
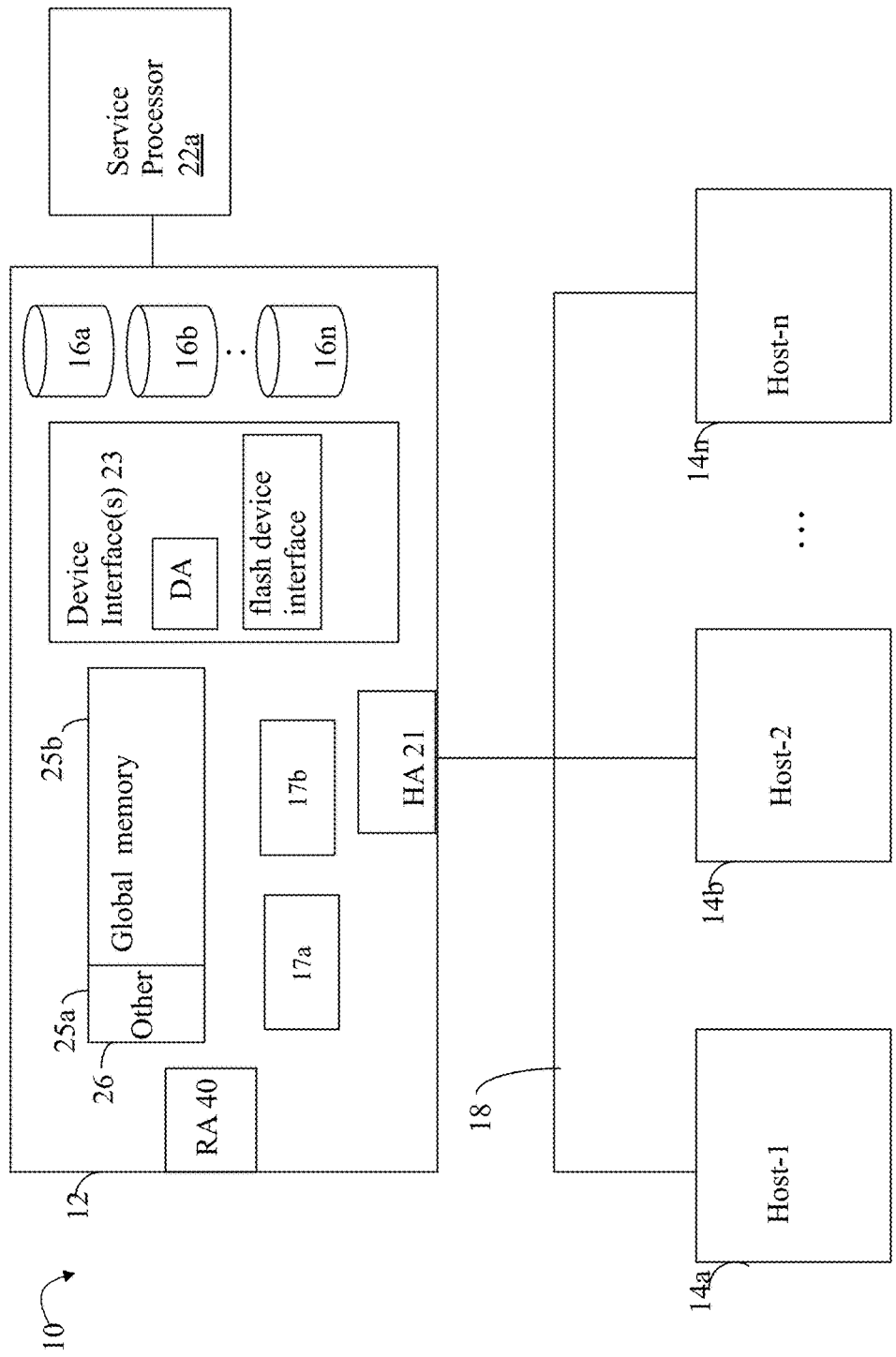
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system may be a single unitary data storage system, such as single data storage array, including two main storage processors or computer processing units (CPUs). Techniques herein may be more generally use in connection with any one or more data storage system each including a different number of main processors than as illustrated herein. The data storage system 12 may be a data storage array, such as a VNX™ data storage array by EMC Corporation of Hopkinton, Mass., including a plurality of data storage devices 16a-16n and two main storage processors or CPUs 17a, 17b. The processors 17a, 17b may be CPUs included in the data storage system for processing requests and commands. In connection with performing techniques herein, an embodiment of the data storage system may include multiple service processors including more than two main CPUs as described. The VNX™ data storage system mentioned above may include two processors 17a, 17b for performing processing in connection with servicing requests. Additionally, the two processors 17a, 17b may be used in connection with failover processing when communicating with the management system 16. More generally, a data storage system may include one or more such main CPUs such as 17a, 17b.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, volumes, or logical units (LUNs). The LUNs may or may not correspond to the actual physical devices or drives 16a-16n. For example, one or more LUNs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN(s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

The device interface, such as a DA, performs I/O operations on a drive 16a-16n. In the following description, data residing on an LUN may be accessed by the device interface following a data request in connection with I/O operations that other directors originate. Data may be accessed by LUN in which a single device interface manages data requests in connection with the different one or more LUNs that may reside on a drive 16a-16n.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

In connection with a data storage system, requests to perform different tasks, operations, and the like, may be serviced by threads that execute in the data storage system. A request may generally be a request to perform any service or operation such as, for example, an I/O operation to read data from and/or write data to a storage device, read data from and/or write data to memory, access another resource in the data storage system to perform an operation, and the like. Generally, as known in the art, a thread may be characterized as a code entity which is scheduled for execution by an operating system. A thread may have an associated state. For example, a thread which is currently executing may be in the run or execution state. When a thread is not executing, the thread may be in a wait state, such as if the thread's execution in block because the thread is waiting for a resource, waiting to acquire a lock, and the like. The foregoing are two different runtime states that may be associated with threads. An embodiment in accordance with techniques herein may have additional thread states and/or states with different names than as described herein depending on the particular embodiment, operating system, and the like. There may be multiple threads in a system ready for execution and an operating system may schedule and select a different thread for execution at various times.

As known in the art, an operating system may include various mechanisms that may be used to synchronize or coordinate execution of multiple threads, provide for mutual exclusive access to a resource, and the like. For example, an operating system may include a primitive such as a lock. In one embodiment of techniques described herein, multiple threads each servicing a different queue of requests may share a software lock that only allows one thread to execute and service its pending requests at a time. A thread that is servicing requests first acquires the lock and holds the lock for the duration of its execution time while servicing requests. The thread releases the lock when done servicing one or more of its pending requests thereby freeing the lock for subsequent acquisition by another thread that is waiting for the lock.

The operating system may use any suitable technique to schedule threads for execution at various times. Described in following paragraphs are techniques that may be used to service requests by multiple threads whereby only a single thread is allowed to execute at a time to service its pending requests. In accordance with techniques herein, when multiple threads each servicing a queue of requests share a software lock that only allows one thread to service requests at a time, an executing thread may be allowed to service multiple requests by using the detection of a single long running request to ensure fairness in scheduling the multiple threads for execution and request servicing. As described in following paragraphs in one embodiment utilizing techniques herein, two or more threads may each service requests and may share a software lock that allows one thread to service requests at a time. Each thread's queue of pending requests may include both short, quick running requests and also slower requests requiring relatively more time to service than the quick running requests. In such an embodiment, system performance may be enhanced by allowing multiple quick running requests to be serviced during a single lock acquisition. Techniques herein may be characterized as using post-processing detection of a longer running slower request to ensure fairness among pending requests awaiting service whereby requests that are expected to have relatively short service times may not need to wait for servicing. As described in more detail elsewhere herein, a thread that is servicing requests acquires the lock and may process multiple short running requests until it encounters a single long running request or otherwise surpasses some threshold of total time or number of requests processed. When the thread that holds the lock detects that the last request it serviced had a relatively long service time, the thread releases the lock, and allows the lock's fairness algorithm to select the next thread for execution.

Figure 2A:
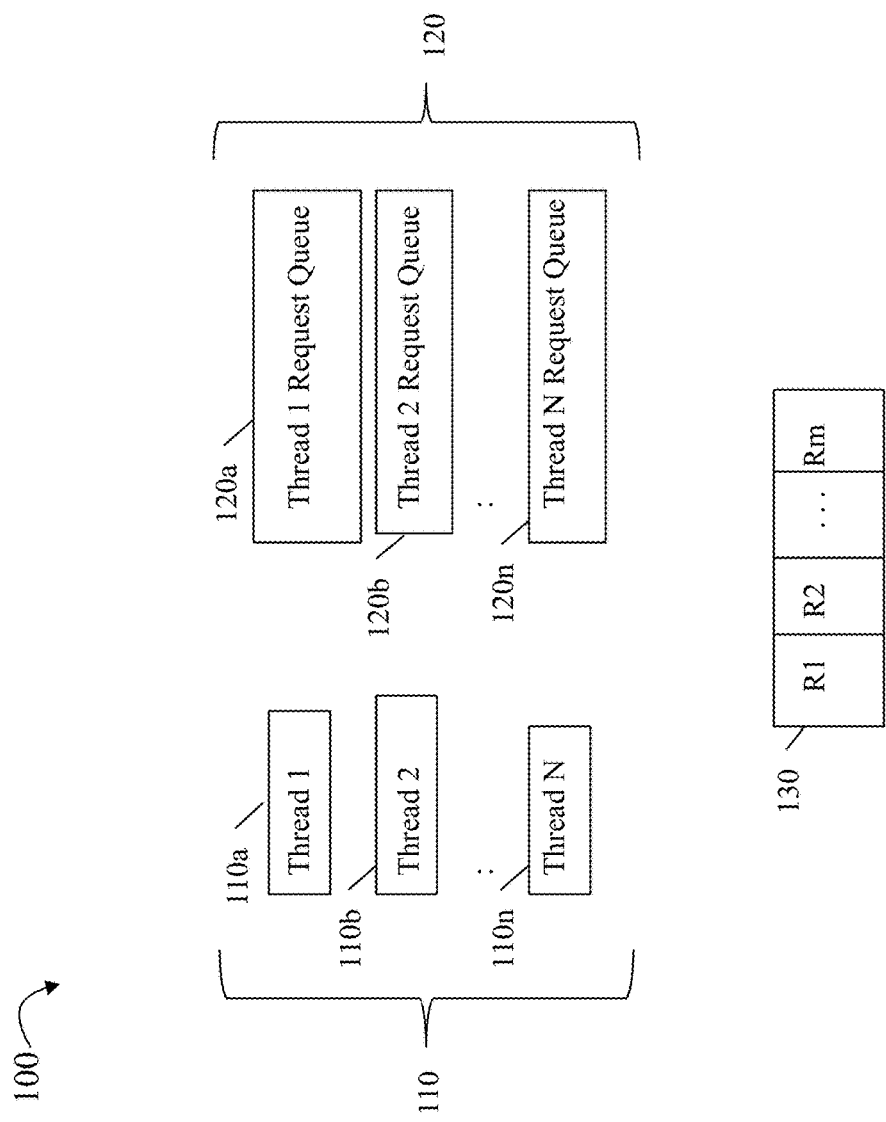
FIGS. 2A and 2B illustrate threads and associated request queues that may be used in an embodiment in accordance with techniques herein.

Referring to FIG. 2A, shown is an example 100 illustrating threads and associated requests queues in an embodiment in accordance with techniques herein. The example 100 includes multiple threads 110 and multiple associated thread-specific request queues 120. Generally, techniques herein may be used with any number of threads. Element 110 illustrates N threads 110a-110n. Element 120 illustrates N thread-specific request queues 120a-120n. Each of the N threads of 110 may have a private or thread-specific request queue. For example, thread 1 110a has an associated queue 120a of pending requests to be serviced by thread 1 110a, thread 2 110*b* has an associated queue 120*b* of pending requests to be serviced by thread 2 110*b*, and so on, for each of the N threads of 110.

Element 130 illustrates in more detail a single one of the request queues of 120. Element 130 illustrates that each of the request queues may generally include any number of M requests, whereby each request in this example is illustrated as "Ri", "i" being an integer denoting a different one of the "m" pending requests awaiting servicing by one of the threads. Although element 130 illustrates only a single request queue, each of the request queues 120*a*-120*n* may be as described in connection with element 130.

As described in more detail below, when one of the threads 110*a*-*n* is scheduled to run by the operating system, that thread will execute and service one or more of the pending requests on its thread-specific queue. The requests on the queues 120*a*-*n* may use one or more different resources and take varying amounts of time to service the requests. Thus, a request may be classified based on one or more characteristics including any of the particular resource(s) utilized, an amount of time to service the request, and the like. In one exemplary embodiment, a request may be characterized as an I/O request or a non-I/O request. An I/O request may read data from and/or write data to a data storage device. A non-I/O request may be characterized as a memory-only request in terms of resources utilized. In other words, a non-I/O request (also referred to herein as a memory-only or memory request) may use memory and not a data storage device to service the request. An I/O request may be characterized as taking a relatively long time to service the request as compared to an amount of time to service a non-I/O or memory-only request. An I/O request may take a relatively long time to service in comparison to the amount of time to service a non-I/O or memory-only request since completion of the I/O request requires waiting for data to be read from and/or written to a physical storage device. As described in more detail elsewhere herein, one of more characteristics of a request, some of which are mentioned above and elsewhere herein, may be used as a heuristic to classify the request as having a relatively long service time or not. For example, if servicing or processing a request includes issuing an I/O operation to a storage device thereby making the request an I/O request as described above, the request may be classified as having a relatively long service time in comparison to a non-I/O request. Such a service time classification may be based on an expected or estimated service time in accordance with whether servicing the request includes issuing an I/O operation.

In this example, only a single thread can service requests at a time so that an embodiment may use a synchronization technique, such as a lock, which is acquired by a thread in order for the thread to process one of its pending queued requests. If a thread cannot acquire a lock, the thread may be characterized as entering a waiting state which waits to acquire the lock in order to execute and service requests. When an executing thread releases the lock, another thread waiting for the lock may then acquire the lock and run. A lock is an example of a synchronization primitive that may be used in an embodiment to only allow a single thread to execute and service requests at a time. It will be appreciated by those skilled in the art that other techniques and primitives may be used to only allow a single thread to execute and service requests at a time.

In one embodiment described herein, the amount of time to service a non-I/O or memory request may be estimated or expected to be less than a specified amount of time, such as the amount of time needed to perform a lock operation such as to acquire the lock (e.g., perform a lock acquisition operation) and/or release the lock. In contrast, the amount of time to service an I/O request may be estimated or expected to be equal to or greater than the specified amount of time, such as the amount of time needed to perform a lock operation such as acquire the lock (e.g., perform a lock acquisition operation) and/or release the lock. Furthermore, in such an embodiment, the number of non-I/O or memory-only requests may typically outnumber I/O requests. At times during operation of the data storage system, memory only requests may outnumber I/O requests at a ratio of 100:1. In such an embodiment, overall performance and service time may be improved using techniques herein whereby multiple non-I/O or memory-only requests may be serviced in connection with a single acquisition of the lock by an executing thread. Additionally, techniques herein may reduce the number of times the lock is acquired and released by the thread in comparison to other ways in which requests may be serviced thereby reducing the overhead amount of time performed in connection with servicing all requests.

What will now be described in more detail is an example illustrating use of techniques herein. For simplicity of illustration, following paragraphs and figures refer to an example with only two threads—thread A and thread B, a small number of requests, and the like. However, such techniques may generally be used with any number of threads, any number and type of requests and resources, and the like.

Figure 2B:
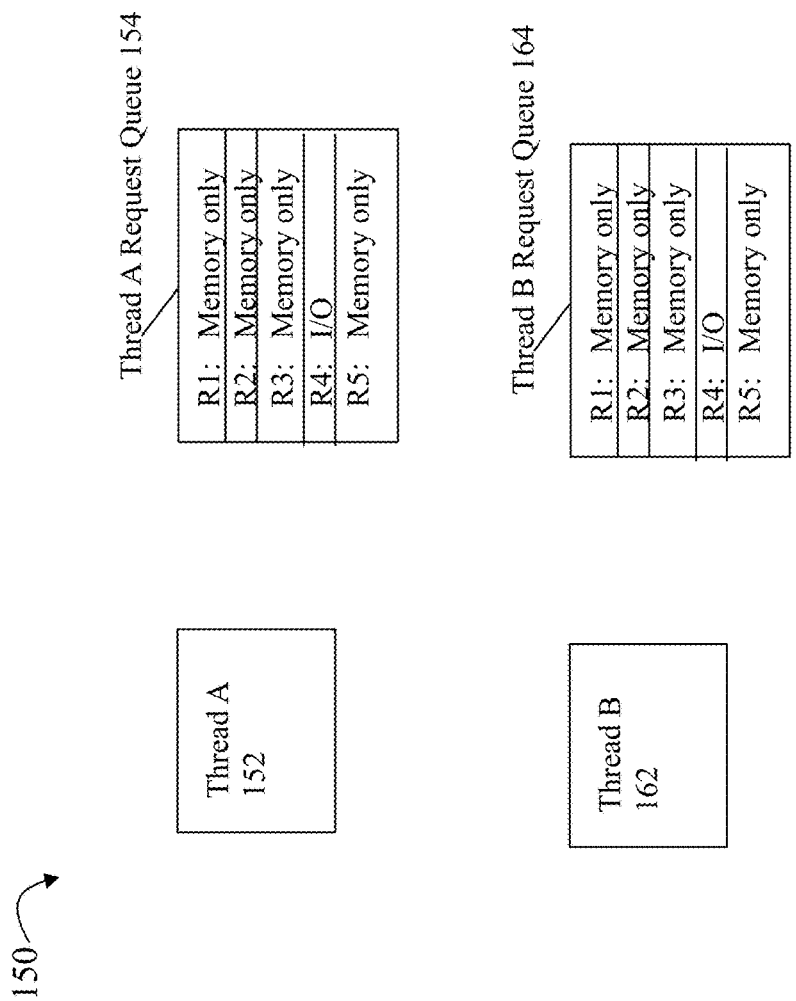

Referring to FIG. 2B, shown is an example 150 including two threads, thread A 152 and thread B 162. Thread A 152 is associated with a thread-specific queue 154 including pending requests to be serviced by thread A 152. Thread B 162 is associated with a thread-specific queue 164 including pending requests to be serviced by thread B 162. Thread A's queue 154 of pending requests includes 5 requests, denoted R1-R5, where each request is either a memory-only request or an I/O request. It should be noted that the particular classification of whether a request is a memory-only or an I/O request is not known prior to completion of servicing the request. Rather, as described in more detail below, whether a request is classified as memory-only or an I/O request may be determined at runtime during execution of the servicing thread after servicing of the request has completed. The classification as memory-only or an I/O request may be made via a runtime determination and tracking regarding what resource(s) are used in connection with servicing the request. Thus, the particular classification of a request as I/O or memory only as denoted in 154 refers to the foregoing runtime determination and classification of the request after the executing thread has completed servicing the request. In this example, element 164 representing thread B's request queue is similar to that as described above in connection with queue 154. Queues 154 and 164 are illustrated as including the same number and types of requests. However, more generally, the queues 154 and 164 may each include a different number of requests having a different mixture or ratio of request types or classifications than illustrated.

What will first be described is one way in which such requests of the example 150 of FIG. 2B may be processed in a system which does not utilized techniques herein.

Figure 3:
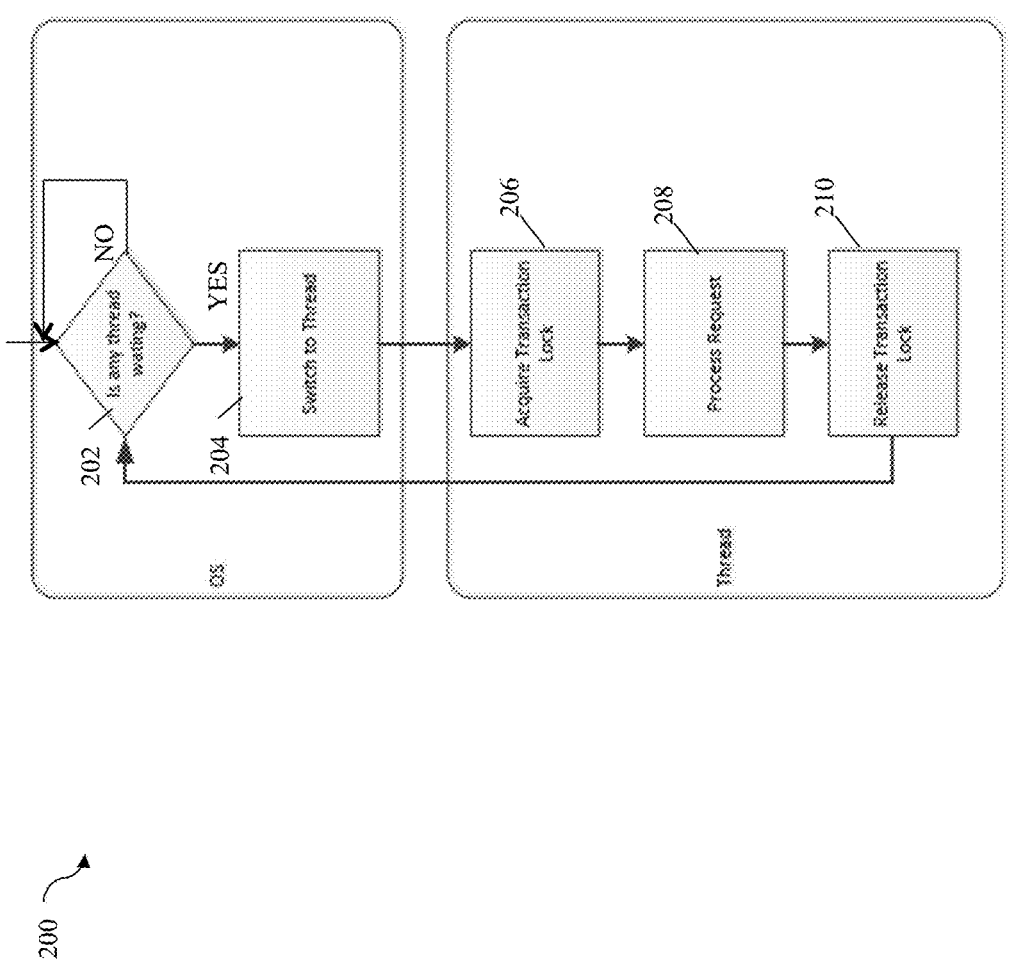
FIG. 3 is a flowchart of processing steps that may be performed in a system which does not utilize techniques herein.

With reference to FIG. 3, shown is a flowchart 200 of processing steps that may be performed in a system in connection with processing requests where the system does not utilize techniques described herein. Steps 202 and 204 may generally illustrate processing performed by the operating system in connection with scheduling execution of a thread that services requests where the thread is waiting to acquire the lock prior to servicing its pending requests. In step 202, a determine is made as to whether any thread is waiting to acquire the lock. While step 202 evaluates to no, control returns to step 202. If step 202 evaluates to yes, control proceeds to step 204 where the thread is selected for execution and a context switch is performed to load the thread's execution context (e.g., state information, code, and the like) so that the thread can subsequently commence execution in step 206. In step 206, the thread acquires the lock and processes one of its pending requests in step 208. After the selected request is serviced in step 208, control then proceeds to step 210 to where the currently executing thread releases the lock and is then placed in a waiting state until the operating system next schedules the thread for execution. From step 210, control returns to the operating system in step 202 where the operating system then selects for execution one of the remaining threads waiting for the lock.

In the processing of FIG. 3, each of the multiple threads waiting for the lock may be scheduled for execution such as in a round-robin manner. When the thread commences execution, it acquires the lock, services a single request from its queue, and releases the lock. The operating system may then select another one of the waiting threads for execution.

Continuing with this example with threads A and B and the particular queues of 5 requests as illustrated in FIG. 2B, FIG. 4 illustrates the processing steps performed by the threads A and B to service their pending requests of FIG. 2B. In this example, each thread A and B services its pending requests in the order in which they appear on respective queues. In other words, the requests may be processing in a FIFO (first in first out) ordering in that the requests are serviced in the relative order in which they are placed on the queue.

In the example 300, each of the steps, denoted Si, i being an integer, corresponds to one step performed by the executing thread (e.g., one of steps 206, 208 and 210 of FIG. 3). Thread A executes first and acquires the lock S1, services its first request R1 in step S2, and releases the lock in S3. Thread A stops executing and is placed in a wait state by the operating system. The operating system then selects thread B for execution which acquires the lock in step S4, services its first request R1 in step S5 and then releases the lock in S6. Thread B stops executing and is placed in a wait state by the operating system. The operating system then selects thread A for execution which acquires the lock in step S7, services its second request R2 in step S8 and then releases the lock in S9. Thread A stops executing and is placed in a wait state by the operating system. The operating system then selects thread B for execution which acquires the lock in step S10, services its second request R2 in step S11 and then releases the lock in S12. The foregoing pattern of execution continues as illustrated in the sequence of steps S1-S30 of FIG. 4 where the operating system alternates between execution of thread A and thread B and each time one of the threads executes, it services the next request in its queue.

As can be seen from the foregoing in FIG. 4, each thread acquires the lock 5 times, releases the lock 5 times, services 4 memory-only or fast requests and services 1 I/O or slow request.

What will now be described is an embodiment of techniques herein for processing the requests of the different thread-specific queues such as illustrated in FIG. 2B. The techniques in following paragraphs may be used as an alternative to processing described in connection with FIGS. 3 and 4 as above.

Described in following paragraphs is an improved technique for processing requests from multiple threads which does not require a priori knowledge about the service time of each request. The determination of a service time classification for the request is performed after the request has been processed. In this manner, a request whose service time (or an estimation thereof) is not known or cannot be known prior to completing the request can be inserted into the queue. With techniques described below, the order in which request are inserted into the queue is preserved so that they are processing in a FIFO order.

Figure 5:
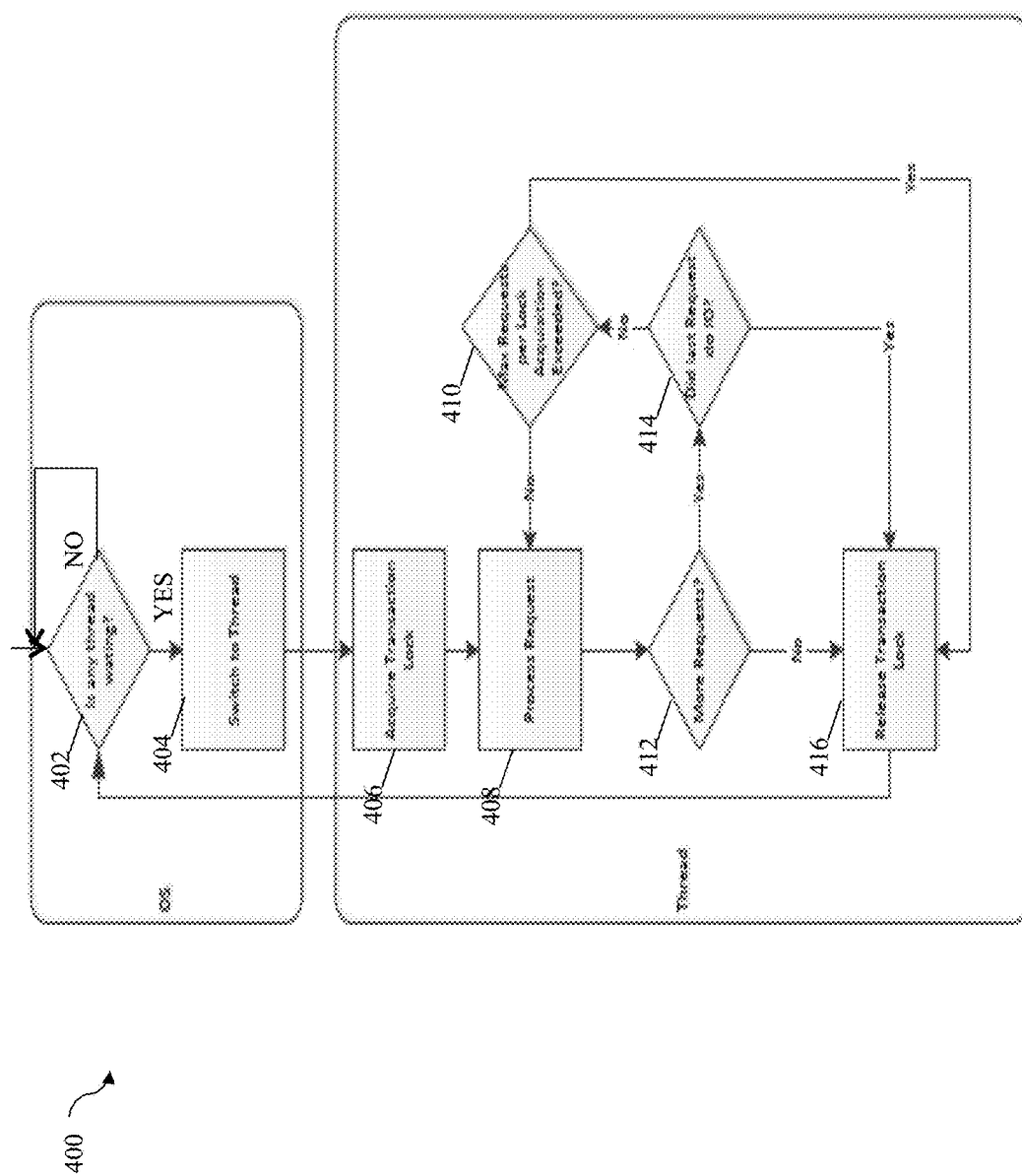
FIG. 5 is a flowchart of processing steps that may be performed in a system in an embodiment in accordance with techniques herein.

Referring to FIG. 5, shown is a flowchart 400 of processing steps that may be performed in an embodiment in accordance with techniques herein. Steps 402, 404, 406 and 408 are similar to, respectively, steps 202, 204, 206 and 208 of FIG. 3. Steps 402 and 404 may generally illustrate processing performed by the operating system in connection with scheduling execution of a thread that services requests where the thread is waiting to acquire the lock prior to servicing its pending requests. In step 402, a determine is made as to whether any thread is waiting to acquire the lock. While step 402 evaluates to no, control returns to step 402. If step 402 evaluates to yes, control proceeds to step 404 where the thread is selected for execution and a context switch is performed to load the thread's execution context (e.g., state information, code, and the like) so that the thread can subsequently commence execution in step 406. In step 406, the thread acquires the lock and processes one of its pending requests in step 408. After the selected request is serviced in step 408, control then proceeds to step 412.

In step 412, a determination is made as to whether there are any additional pending requests in the executing thread's queue. If step 412 evaluates to no, control proceeds to step 416 where the thread releases the lock. Step 416 is similar to step 210 of FIG. 3. If step 412 evaluates to yes, control proceeds to step 414. At step 414, a determination is made as to whether servicing the last request processed by the thread in step 408 included issuing an I/O to a storage device. As described herein, a request which resulted in issuing such an I/O is estimated or expected to have a relatively long service time as compared to a memory-only or non-I/O request. In contrast, a non-I/O or memory-only request is expected to have a relatively short or quick service time. If step 414 evaluates to yes meaning that the last serviced request is estimated to have had a long service time (e.g., slow request), control proceeds to step 416. If step 414 evaluates to no, meaning that the last serviced request is estimated to have had a short or quick service time (e.g., fast request), control proceeds to step 410. At step 410, a determination is made as to whether the currently executing thread has processed a number of requests that exceeds a maximum threshold number of requests. If step 410 determines that the currently executing thread has processed a number of requests that exceeds the maximum threshold, control proceeds to step 416. If step 410 determines that the currently executing thread has processed a number of requests that does not exceed the maximum threshold, control proceeds to step 408 to process the next request in the thread's queue of pending requests.

Figure 6:
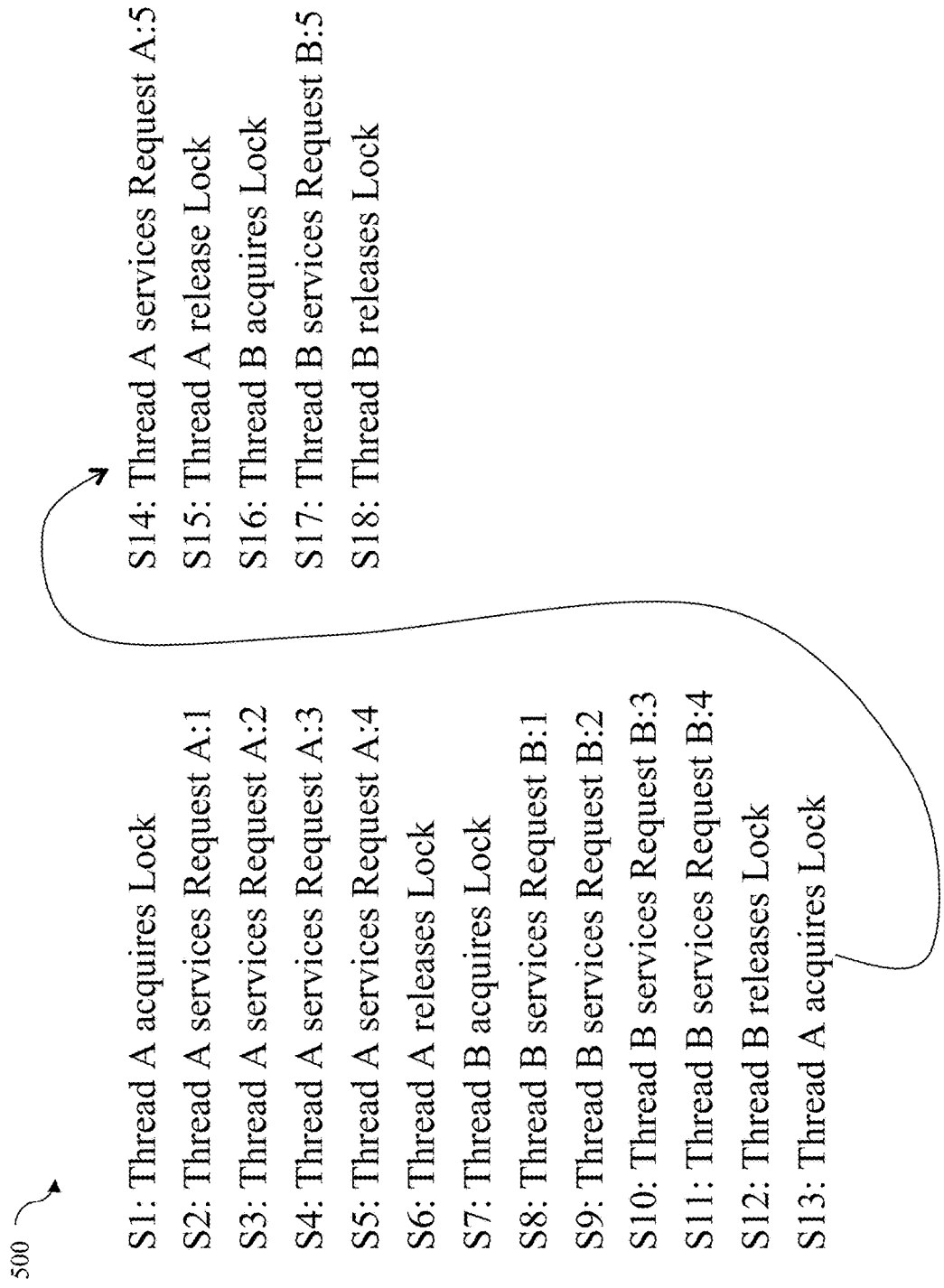
FIG. 6 is an example illustrating steps performed by two threads using FIG. 5 processing in an embodiment in accordance with techniques herein.

Continuing with this example with threads A and B and the particular queues of 5 requests as illustrated in FIG. 2B using the flowchart of FIG. 5, FIG. 6 illustrates the processing steps performed by the threads A and B to service their pending requests of FIG. 2B. In this example, each thread A and B services its pending requests in the order in which they appear on respective queues. In other words, the requests may be processing in a FIFO (first in first out)

ordering in that the requests are serviced in the relative order in which they are placed on the queue.

In the example 500, each of the steps, denoted Si, i being an integer, corresponds to one step of FIG. 5 performed by the executing thread (e.g., one of steps 406, 408 and 416 of FIG. 3). Thread A executes first and acquires the lock S1 (performs step 406), services its first request (memory only request) R1 in step S2 (step 408), its second request (memory only request) R2 in step S3 (step 408), its third request (memory-only request) R3 in step S4 (step 408), and its fourth request (I/O request) in step S5 (step 408). In connection with servicing the foregoing requests, each of requests 1-3 are memory only requests whereby control proceeds from step 410 to step 408. The 4$^{th}$ request serviced was an I/O request causing control to proceed from step 414 to step 416 where in step S6 thread A releases the lock. Thread A stops executing and is placed in a wait state by the operating system.

The operating system then selects thread B for execution which acquires the lock in step S7 (step 406), services its first request (memory only request) R1 in step S8 (step 408), services its second request (memory only request) R2 in step S9 (step 408), services its third request (memory only request) R3 in step S10 (step 408) and its fourth request (I/O request) in step S11 (step 408). In connection with thread B servicing the foregoing requests, each of requests 1-3 are memory only requests whereby control proceeds from step 410 to step 408. The 4$^{th}$ request serviced was an I/O request causing control to proceed from step 414 to step 416 where in step S12 thread B releases the lock. Thread B stops executing and is placed in a wait state by the operating system.

The operating system then again selects thread A for execution which acquires the lock in step S13 (step 406), services its last and 5$^{th}$ request (memory only request) R5 in step S14 (step 408), and then releases the lock in S15 (step 416). Thread A stops executing. The operating system then selects thread B once again for execution which acquires the lock in step S16 (step 406), services its last and 5$^{th}$ request (memory only request) R5 in step S17, and then releases the lock in S16 (step 416). Thread B stops executing.

As can be seen from the foregoing in FIG. 6, each thread acquires the lock 2 times, releases the lock 2 times, services 4 memory-only or fast requests and services 1 I/O or slow request. An executing thread is allowed to service multiple fast requests until the first slow request is service with a single lock acquisition. Use of techniques herein such as described in connection with FIGS. 5 and 6 reduces overall time in servicing the requests as compared to a system such as described above in connection with FIGS. 3 and 4 which does not utilize such techniques. In accordance with FIGS. 5 and 6, techniques herein reduce the number of times each thread acquires and releases the lock and also reduces the number of context switches the operating system performs in connection with switching execution between different threads.

Techniques herein prevent starvation whereby a thread never executes. For example, starvation may occur where, if thread A acquires a lock and is executing and may never release the lock whereby thread B never acquires the lock and therefore never executes. To prevent starvation, an embodiment in accordance with techniques herein may release an acquired lock if the last request serviced performed I/O. Additionally, techniques herein may allow any executing thread to only continue execution if it has not yet serviced a maximum threshold number of requests. More generally, an embodiment may use other starvation prevention techniques. For example, rather than impose a maximum threshold of requests, a maximum time threshold may be specified whereby the thread which currently holds the lock is not allowed to continue processing its queued requests once the amount of time that the thread has executed exceeds the maximum time threshold. It should be noted that the amount of time that the thread has executed while holding the lock (e.g., since the thread acquired the lock) may be estimated. The amount of time that has elapsed since the thread acquired the lock may be estimated, for example, based on the one or more resources used in processing each of the one or more processed request(s), and/or based on the number of requests processed. An embodiment may then estimate a total amount of time that a thread has been executing based on an estimated amount of time for each request processed. For example, a thread may service 5 non-I/O or memory-only requests (e.g., which only use a memory resource). An average or maximum amount of time, T1, for processing a single non-I/O request may be used as an estimate for service time of a single request. Thus, in this example, the estimated amount of time that the thread has been executing may be 5*T1. If 5*T1 is less than the maximum time threshold, the thread is allowed to continue processing additional requests. Otherwise, if 5*T1 is not less than the maximum time threshold, the thread is not allowed to continue processing additional requests and releases the lock.

In an embodiment utilizing techniques herein, the maximum threshold of requests used in step 410 of FIG. 5 may be determined for, and may vary with, the particular system. For example, an embodiment may, through experimentation, modeling, simulation and the like, determine the maximum threshold of requests as an optimal value such as to achieve a best average response time (RT) for servicing a request in the data storage system.

An embodiment in accordance with techniques herein may operate without apriori knowledge, prior to servicing the request, as to whether the request is classified as "fast" (e.g. a non I/O request expected to have a relatively short service time) or "slow" (e.g., an I/O request expected to have a relatively long service time).

The requests are not required to be classified by type as I/O (e.g., slow) or non-I/O (e.g., fast) prior to servicing the request. In other words, the requests in the queues are not preclassified and do not have an associated classification of I/O or non-I/O when in the queue prior to servicing the request. Rather, in step 414 in one embodiment, there may be a runtime determination as to whether a request just executed performed I/O or used one or more particular resources. In one embodiment performing step 414, a runtime call may be made which returns a value (e.g., such as a flag value) identifying whether or not an I/O operation was performed when servicing the last request by the executing thread. For example, the call may return a first value, such as 1, if the last request serviced required I/O to be performed and may otherwise return a second value, such as 0. In this manner, the thread servicing the request may conditionally execute code which performs an I/O operation dependent on one or more conditions that may vary dynamically at runtime. In other words, classification of a thread as I/O or non-I/O may be dynamically determined and may vary depending on one or more runtime conditions.

As mentioned herein, the particular resource utilized or operation performed in servicing a request, such as whether an I/O operation to read and/or write data to a storage device is performed in servicing the request, may be used as a heuristic in determining a service time classification for the request. For example, as described herein, if an I/O operation to read and/or write data to a storage device is performed in servicing the request, then it is presumed that the request has a relatively long service time and the request is characterized as "slow". If no such I/O operation is performed in servicing the request, then it is presumed that the request has a relatively short service time and the request is characterized as "fast".

More generally, a runtime determination may be made as to what one or more resources have been used in servicing the last completed request and, based on the one or more resources used, the service time classification for the request may be determined (e.g., the request may be classified as a fast request or a slow request). For example, if servicing a request includes waiting for a network resource, accessing a data storage device, using only memory and not accessing a data storage device, and the like, the foregoing may be used as a heuristic in estimating the expected service time for the request and thus in determining a service time classification for the request.

It should be noted that the use of heuristics as described herein in determining a service time classification for a request has an advantage in that processing performed to determine the service time classification need not measure the actual elapsed time consumed while processing the request. In this manner, additional processing time and resources to measure such actual elapsed time are not consumed. Rather, one or more other characteristics of the request, such as the resource used or particular operation performed, may be used as a heuristic to indirectly determine a service time classification for the request or otherwise provide a service time estimate or expected service time range for servicing the request.

An embodiment in accordance with techniques described herein may use a single queue of requests for a thread without requiring presorting or preclassifying the requests based on expected service time, resources used, and the like. In one embodiment, the single queue of requests for a thread may be processed on a FIFO (first-in-first-out) basis on the order in which such requests are received by the thread for processing. Thus, techniques herein process the requests in the order in which such requests are queued whereby preprocessing of requests is not required. For example, the requests are not reordered in the queue based on any characteristic of the requests, are not placed in multiple queues based on request characteristics, and the like.

As a generalization to that as described above, one or more criteria may be used to determine the service time classification or estimated service time for the request. Such criteria may include what one or more resources are used in servicing the request, what one or more types of processing are performed in servicing the request, and the like. A runtime determination may be made after processing a request as to whether the request is slow or fast. Such a runtime determination may be based on estimated or expected service time in accordance with one or more criteria to determine a service time classification of the request without measuring actual elapsed service time.

Although techniques herein are described in an embodiment in connection with servicing requests in a data storage system, variations and generalization of techniques herein will be readily appreciated by those of ordinary skill in the art. For example, techniques herein may be generally used in any suitable system, with any type of request and resources, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing requests comprising:
   selecting a first thread of a plurality of threads for execution at a first point in time, wherein only a single one of the plurality of threads is allowed to execute at a time and wherein each of the plurality of threads is associated with one of a plurality of queues of thread-specific requests to be processed by said each thread;
   selecting a first request from the one queue of requests associated with the first thread;
   performing first processing by the first thread to service the first request;
   determining, in accordance with one or more criteria, a service time classification for the first request, wherein said one or more criteria include a runtime determination of what one or more resources were used by said first processing in servicing the first request, wherein said determining the service time classification of the first request is performed after the first thread has completed servicing the first request and at runtime during execution of the first thread;
   determining, in accordance with the service time classification, whether to allow the first thread to continue execution and process a second request from the one queue of requests associated with the first thread;
   if it is determined in accordance with the service time classification to allow the first thread to continue execution, performing second processing by the first thread to service the second request, and otherwise, selecting a second of the plurality of threads for execution;
   determining a number of requests the first thread has processed since commencing execution at the first point in time;
   determining whether the number of requests exceeds a maximum number of requests; and
   if it is determined that the number of requests exceeds the maximum number of requests, selecting another one of the plurality of threads for execution rather than the first thread, and otherwise allowing the first thread to continue execution processing another request from the one queue of requests associated with the first thread.

2. The method of claim 1, wherein the service time classification is determined without measuring an actual amount of time that has elapsed since said first thread commenced execution at the first point in time.

3. The method of claim 1, wherein the one or more criteria include a runtime determination as to whether said first processing issued an I/O request to a storage device in connection with servicing the first request.

4. The method of claim 3, wherein if the first processing issued an I/O request to a storage device in connection with servicing the first request, the service time classification is a first value denoting a first estimated service time for servicing the first request whereby the first estimated service time is greater than or equal to a first amount of time.

5. The method of claim 4, wherein the one or more criteria include a runtime determination as to whether said first processing only used a memory resource in connection with servicing the first request.

6. The method of claim 5, wherein if the first processing only uses a memory resource in connection with servicing the first request, the service time classification is a second value denoting a second estimated service time for servicing the first request whereby the second estimated service time is less than a first amount of time.

7. The method of claim 6, wherein if the service time classification is the second value, the first thread is allowed to continue execution.

8. The method of claim 6, wherein if the service time classification is the first value, the first thread is not allowed to continue execution and enters a waiting state, and wherein the second thread is selected for execution.

9. The method of claim 1, wherein a lock is used to enforce a processing requirement that only a single one of the plurality of threads is allowed to execute at a time whereby, prior to said single one of the plurality of threads servicing any request, said single one of the plurality of threads acquires the lock.

10. The method of claim 9, wherein, prior to said first thread servicing any request after commencing execution at the first point in time, the first thread acquires the lock.

11. The method of claim 10, wherein if it is determined in accordance with the service time classification not to allow the first thread to continue execution, the method further includes:
   releasing the lock by the first thread, wherein after said releasing, the first thread waits to reacquire the lock and to be scheduled again for execution; and
   responsive to said releasing, acquiring the lock by the second thread and commencing execution of the second thread, wherein the second thread acquires the lock prior to said second thread servicing any request.

12. The method of claim 1, wherein the plurality of threads process requests in a data storage system.

13. The method of claim 1, wherein requests in each of the plurality of queues of requests are processed on a first-in-first-out basis by a corresponding one of the plurality of threads associated with said each queue.

14. A computer readable medium comprising code stored thereon that processes requests, wherein the computer readable medium comprises code, that when executed by a processor, performs a method comprising:
   selecting a first thread of a plurality of threads for execution at a first point in time, wherein only a single one of the plurality of threads is allowed to execute at a time and wherein each of the plurality of threads is associated with one of a plurality of queues of thread-specific requests to be processed by said each thread;
   selecting a first request from the one queue of requests associated with the first thread;
   performing first processing by the first thread to service the first request;
   determining, in accordance with one or more criteria, a service time classification for the first request, wherein said one or more criteria include a runtime determination of what one or more resources were used by said first processing in servicing the first request, wherein said determining the service time classification of the first request is performed after the first thread has completed servicing the first request and at runtime during execution of the first thread;
   determining, in accordance with the service time classification, whether to allow the first thread to continue execution and process a second request from the one queue of requests associated with the first thread;
   if it is determined in accordance with the service time classification to allow the first thread to continue execution, performing second processing by the first thread to service the second request, and otherwise, selecting a second of the plurality of threads for execution;
   determining a number of requests the first thread has processed since commencing execution at the first point in time;
   determining whether the number of requests exceeds a maximum number of requests; and
   if it is determined that the number of requests exceeds the maximum number of requests, selecting another one of the plurality of threads for execution rather than the first thread, and otherwise allowing the first thread to continue execution processing another request from the one queue of requests associated with the first thread.

15. The computer readable medium of claim 14, wherein the service time classification is determined without measuring an actual amount of time that has elapsed since said first thread commenced execution at the first point in time.

16. The computer readable medium of claim 14, wherein the one or more criteria include a runtime determination as to whether said first processing issued an I/O request to a storage device in connection with servicing the first request.

17. The computer readable medium of claim 16, wherein if the first processing issued an I/O request to a storage device in connection with servicing the first request, the service time classification is a first value denoting a first estimated service time for servicing the first request whereby the first estimated service time is greater than or equal to a first amount of time.

18. The computer readable medium of claim 17, wherein if the service time classification is the first value, the first thread is not allowed to continue execution.

19. A system comprising:
   a plurality of storage devices;
   at least one processor that executes machine readable instructions;
   a memory comprising code stored that, when executed, performs a method comprising:
      selecting a first thread of a plurality of threads for execution at a first point in time, wherein only a single one of the plurality of threads is allowed to execute at a time and wherein each of the plurality of threads is associated with one of a plurality of queues of thread-specific requests to be processed by said each thread;
      selecting a first request from the one queue of requests associated with the first thread;
      performing first processing by the first thread to service the first request;
      determining, in accordance with one or more criteria, a service time classification for the first request, wherein said one or more criteria include a runtime determination of what one or more resources were used by said first processing in servicing the first request, wherein said determining the service time classification of the first request is performed after the first thread has completed servicing the first request and at runtime during execution of the first thread;
      determining, in accordance with the service time classification, whether to allow the first thread to continue execution and process a second request from the one queue of requests associated with the first thread;

if it is determined in accordance with the service time classification to allow the first thread to continue execution, performing second processing by the first thread to service the second request, and otherwise, selecting a second of the plurality of threads for execution;

determining a number of requests the first thread has processed since commencing execution at the first point in time;

determining whether the number of requests exceeds a maximum number of requests; and if it is determined that the number of requests exceeds the maximum number of requests, selecting another one of the plurality of threads for execution rather than the first thread, and otherwise allowing the first thread to continue execution processing another request from the one queue of requests associated with the first thread.

* * * * *